United States Patent [19]

Bush et al.

[11] Patent Number: 5,283,235

[45] Date of Patent: Feb. 1, 1994

[54] COMPOSITIONS CONTAINING ESTERS OF CARBOXY-CONTAINING INTERPOLYMERS AND METHODS OF USING THE SAME

[75] Inventors: James H. Bush; Richard W. Jahnke, both of Mentor; Lawrence J. Kocurek, Willowick, all of Ohio

[73] Assignee: The Lubrizol Corporation, Wickliffe, Ohio

[21] Appl. No.: 853,064

[22] Filed: Mar. 17, 1992

[51] Int. Cl.$^5$ .............................................. C09K 7/02
[52] U.S. Cl. .................................. 507/118; 507/119; 507/120; 507/125; 252/8.551
[58] Field of Search ............... 507/118, 119, 120, 125; 526/329.2; 252/8.551

[56] References Cited

U.S. PATENT DOCUMENTS

| | | | |
|---|---|---|---|
| 2,826,548 | 3/1958 | Busch | 252/8.5 |
| 2,938,016 | 5/1960 | Johnson | 260/78.5 |
| 2,977,334 | 3/1961 | Zopf, Jr. et al. | 260/27 |
| 2,980,653 | 4/1961 | Johnson | 260/78.5 |
| 3,085,994 | 4/1963 | Muskat | 260/78.5 |
| 3,342,787 | 9/1967 | Muskat | 260/78.5 |
| 3,418,292 | 12/1968 | Muskat | 260/78.5 |
| 3,451,979 | 6/1969 | Muskat | 260/78.5 |
| 3,536,461 | 10/1970 | Mueller et al. | 44/62 |
| 3,558,570 | 1/1971 | Rinno et al. | 260/78.5 |
| 3,702,300 | 11/1972 | Coleman | 252/51.5 A |
| 3,709,819 | 1/1973 | Browning et al. | 252/8.5 |
| 3,723,375 | 3/1973 | Field et al. | 260/29.6 TA |
| 3,738,934 | 6/1973 | Browning et al. | 252/8.5 P |
| 4,140,640 | 2/1979 | Sckerubel | 252/8.55 |
| 4,306,980 | 12/1981 | Brandt et al. | 252/8.5 P |
| 4,329,249 | 5/1982 | Forsberg | 252/34.7 |
| 4,368,133 | 1/1983 | Forsberg | 252/75 |
| 4,435,297 | 3/1984 | Forsberg | 252/34.7 |
| 4,436,636 | 3/1984 | Carnicom | 252/8.5 P |
| 4,447,348 | 5/1984 | Forsberg | 252/75 |
| 4,448,703 | 5/1984 | Forsberg | 252/75 |
| 4,526,950 | 7/1985 | Grava | 526/272 |
| 4,566,978 | 1/1986 | Strong et al. | 252/8.5 |
| 4,708,753 | 11/1987 | Forsberg | 149/2 |
| 4,770,803 | 9/1988 | Forsberg | 252/75 |
| 4,776,966 | 10/1988 | Baker | 252/8.515 |
| 4,816,551 | 3/1989 | Oehler et al. | 528/295.3 |
| 4,828,633 | 5/1989 | Forsberg | 149/2 |
| 5,096,603 | 3/1992 | Peiffer et al. | 507/122 X |

OTHER PUBLICATIONS

OTC 5904, 1989 Offshore Technology Conference Optimising Oil Muds for Offshore Drilling and Lower Environment Impact by R. P. Jachnik & D. S. Marshall, Milpark Drilling Fluids pp. 203–212.

Gray et al, *Composition and Properties of Oil Well Drilling Muds* (Houston, Gulf Publishing Co., 1980) pp. 65–66, 545–546.

*Primary Examiner*—Gary Geist
*Attorney, Agent, or Firm*—Frederick D. Hunter; John H. Engelmann; James A. Cairns

[57] ABSTRACT

This invention relates to a composition comprising a mixture of a brine and a liquid hydrocarbon, and (A) a viscosity increasing amount of at least one ester of a carboxy-containing interpolymer or salt thereof wherein the interpolymer is prepared by polymerizing an olefin selected from the group consisting of alpha-olefins and vinyl aromatic monomers with at least one alpha, beta-unsaturated carboxylic acylating agent, and provided that when the olefin is vinyl toluene, then the alpha, beta-unsaturated carboxylic acylating agent is an alpha, beta-unsaturated dicarboxylic acylating agent. The compositions of the present invention are useful as drilling fluids as well as completion fluids. The esters of the carboxy-containing interpolymer or salts thereof provide beneficial viscosity, formation stabilization, emulsification and rheology properties to the fluids.

37 Claims, No Drawings

COMPOSITIONS CONTAINING ESTERS OF CARBOXY-CONTAINING INTERPOLYMERS AND METHODS OF USING THE SAME

TECHNICAL FIELD OF THE INVENTION

This invention relates to compositions containing esters of carboxy-containing interpolymers.

BACKGROUND OF THE INVENTION

The primary functions of a drilling fluid or mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and production.

Useful drilling fluids or muds must maintain rheological and viscosity properties under normal operation conditions. Also, the drilling fluids or muds must be able to suspend cuttings and weighting materials upon stopping of circulation of the drilling fluid. It is desirable to have drilling fluids or muds which maintain thixotropy and rheology even with increased solids.

U.S. Pat. Nos. 2,938,016; 2,980,653; 3,085,994; 3,342,787; 3,418,292; 3,451,979; 3,536,461; 3,558,570; 3,702,300; and 3,723,375 relate to carboxy-containing interpolymers, methods of making the carboxy-containing interpolymers, and esters and nitrogen-containing esters derived therefrom.

U.S. Pat. No. 2,977,334 relates to derivatives of ethylene-maleic anhydride copolymers. These polymers are useful as coating resins, synthetic varnish for drying oils, additive for mineral or synthetic oils, paper and textile sizing agents, laminating, casting and potting resins, adhesive agents, waterproofing agents, film-forming polymers and plasticizers.

U.S. Pat. No. 3,738,934 issued to Broning et al. relates to oil-base drilling fluid compositions, additives and filter cakes which are effective under high temperature pressures. The fluid is formed by dispersing particles of an oil and water insoluble vinyl toluene-acrylate copolymer resin in a water-in-oil emulsion drilling fluid.

U.S. Pat. No. 4,526,950 relates to polymers of alpha-olefins and alpha, beta-unsaturated carboxylic acids or derivatives and methods of making these polymers.

U.S. Pat. No. 4,566,978 relates to high temperature drilling fluids. The drilling fluid comprises a water-base, clay suspended in the base and a hydrolyzed terpolymer of maleic anhydride, styrene and a third monomer selected from a acrylamide, methacrylamide, acrylic acid or methacrylic acid.

SUMMARY OF THE INVENTION

This invention relates to a composition comprising a mixture of a brine and a liquid hydrocarbon, and (A) a viscosity increasing amount of at least one ester of a carboxy-containing interpolymer or salt thereof wherein the interpolymer is prepared by polymerizing an olefin selected from the group consisting of alpha-olefins and vinyl aromatic monomers with at least one alpha, beta-unsaturated carboxylic acylating agent, and provided that when the olefin is vinyl toluene, then the alpha, beta-unsaturated carboxylic acylating agent is an alpha, beta-unsaturated dicarboxylic acylating agent.

The compositions of the present invention are useful as drilling fluids as well as completion fluids. The esters of the carboxy-containing interpolymer or salts thereof provide beneficial viscosity, formation stabilization, emulsification and rheology properties to the fluids.

DESCRIPTION OF THE PREFERRED EMBODIMENTS

The term "emulsion" as used in the specification and the claims is intended to cover water-in-oil emulsion. The term is intended to cover compositions derived from or formulated as water-in-oil emulsions which are gelatinuous or semi-gelatinuous compositions.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-substituted aliphatic substitutents or aromatic-substituted alicyclic substituents, or aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon nature of the substituent; those skilled in the art will be aware of such groups (e.g., halo (especially chloro and fluoro), hydroxy, alkoxy, mercapto, alkylthio, nitro, nitroso, sulfoxy, etc.);

(3) hetero substituents, that is, substituents which will, while having a predominantly hydrocarbon character within the context of this invention, contain an atom other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In one embodiment, the hydrocarbyl group is purely hydrocarbon.

As used in the specification and claims, the term carboxy-containing refers to polymers which are prepared using a carboxy-containing monomer. The carboxy-containing monomer is polymerized with other monomers to form the carboxy-containing interpolymer. Since the carboxy-containing monomer is incorporated into the polymer backbone, the carboxy groups extend from the polymer backbone, e.g., the carboxy groups are directly attached to the polymer backbone.

As described above, the invention relates to compositions containing (A) an emulsifying amount of at least one ester of a carboxy-containing interpolymer. The esters of the carboxy-containing interpolymer may be present in an amount from about 0.5, or about 1, up to about 10, or to about 7, or to about 5 pounds per barrel (ppb.)

(A) Esters of Carboxy-Containing Interpolymers

The carboxy-containing interpolymer is prepared by polymerizing an alpha-olefin or vinyl aromatic monomer with an alpha, beta-unsaturated carboxylic acylating agent, provided that when the olefin is vinyl toluene, then the alpha, beta-unsaturated carboxylic acylating agent is a dicarboxylic acylating agent.

The carboxy-containing interpolymers useful in preparing the esters useful in the invention are copolymers, terpolymers, and other interpolymers of alpha, beta-unsaturated carboxylic acylating agents or mixtures of two or more of any of these, and one or more olefins. Carboxylic acylating agents include carboxylic acids, anhydrides, esters (lower alkyl esters containing from 1 to 7 carbon atoms), halides, etc.

OLEFINS

The olefins are selected from the group consisting of aliphatic-olefins and vinyl aromatic monomers. These compounds serve as a connective moiety for the alpha, beta-unsaturated compounds in forming the carboxy-containing interpolymers. Suitable aliphatic olefin monomers that are useful in the preparation of the interpolymers of the invention are mono-olefins of about 2, or about 8 to about 30, or to about 24 carbon atoms. Included in this group are internal olefins and the mono-1-olefins or alpha-olefins. The alpha-olefins are preferred. Exemplary olefins include ethylene, propylene, 1-butene, isobutene, 1-pentene, 2-methyl-1-butene, 3-methyl-1-butene, 1-hexene, 1-heptene, 1-octene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-deocosene, 1-tetracosene, 1-pentacosene, 1-hexacosene, 1-octacosene, 1-nonacosene, etc. Commercially available alpha-olefin can also be used. Exemplary alpha-olefin mixtures include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. Additionally, $C_{30}+$ alpha-olefin fractions such as those available from Gulf Oil Company under the name Gulftene can be used. In one embodiment, the olefin monomers include ethylene, propylene and 1-butene.

The mono-olefins may be derived from the cracking of paraffin wax. The wax cracking process yields both even and odd number $C_{6-20}$ liquid olefins of which 85% to 90% are straight chain 1-olefins. The balance of the cracked wax olefins is made up of internal olefins, branched olefins, diolefins, aromatics and impurities. distillation of the $C_{6-20}$ liquid olefins obtained from the wax cracking process yields fractions (e.g., $C_{15-18}$ alpha-olefins) which are useful in preparing the interpolymers of this invention.

Other mono-olefins can be derived from the ethylene chain growth process. This process yields even numbered straight-chain 1-olefins from a controlled Ziegler polymerization. Other methods for preparing the mono-olefins of this invention include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632–657, Interscience Publishers, Div. of John Wiley and Son, 1971, which is hereby incorporated by reference for its relevant disclosures pertaining to methods for preparing mono-olefins.

Suitable vinyl aromatic monomers which may be polymerized include styrene and the substituted styrenes. The substituted styrenes include the halo-substituted styrenes (e.g., alpha-halostyrenes), and the hydrocarbyl-substituted styrenes wherein the hydrocarbyl group has from 1 to about 12 carbon atoms. Exemplary of the hydrocarbyl-substituted styrenes are the alpha-methylstyrene, paratert-butylstyrene, alpha-ethylstyrene, and para-lower alkoxy styrene ($C_{1-6}$). Mixtures of two or more vinyl aromatic monomers can be used. Styrene is the preferred vinyl aromatic monomer.

ALPHA, BETA UNSATURATED ACYLATING AGENTS

Suitable alpha, beta-unsaturated carboxylic acylating agents include mono-carboxylic (e.g., acrylic, methacrylic and crotonic acylating agents) as well as dicarboxylic acylating agents wherein a carbon-to-carbon double bond is in an alpha, beta-position to at least one of the carboxy functions (e.g., maleic, fumaric, itaconic mesaconic and citraconic acylating agents).

A class of preferred alpha, beta-unsaturated dicarboxylic acylating agent includes those compounds corresponding to one of the formulae:

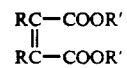

and

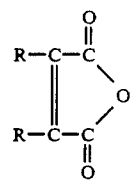

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl group of up to about 7 carbon atoms (e.g., methyl, ethyl, butyl or heptyl groups). These preferred alpha, beta-unsaturated dicarboxylic acylating agents contain a total carbon content of up to about 25 carbon atoms, normally up to about 15 carbon atoms. Examples include maleic anhydride; benzyl maleic anhydride; chloromaleic anhydride; heptyl maleate; citaconic anhydride; ethyl fumarate; fumaric acid; mesaconic acid; ethyl, isopropyl maleate; isopropyl fumarate; hexyl, methyl maleate; phenyl maleic anhydride and the like. Of these preferred alpha, beta-unsaturated dicarboxylic compounds, maleic acylating agents are preferred.

Alternatively, the ester (OR') group in the above formula may contain more than 7 carbon atoms, being derived from a mixture of alcohols, some containing over 7 carbon atoms, and in such instances, the ester group may remain attached to the carboxy group during and after formation of the interpolymer. This procedure provides a method of introducing the desirable ester groups initially, and eliminates the need to introduce the ester groups in a separate subsequent step.

CARBOXY-CONTAINING INTERPOLYMERS

The molecular weight of the carboxy-containing interpolymer may be expressed in terms of the "reduced specific viscosity". Reduced specific viscosity is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a dilute solution (of one gram) of the interpolymer in 100 ml. of acetone and the viscosity of acetone at 30°±0.02° C. Whenever reference is made in this application to RSV or reduced specific viscosity, the reference is to the interpolymer before it is esterified. A more detailed discussion of the reduced specific viscosity, also known as the specific viscosity, as well as its relationship to the average molecular weight of an interpolymer, appears in Paul J. Flory, *Principles of Polymer Chemistry*, (1953 Edition) pages 308 et seq.

The carboxy-containing interpolymers of the present invention generally have a reduced specific viscosity from about 0.05, or about 0.1, or about 0.15, or even about 0.3 up to about 2, or to about 1. In another embodiment, the carboxy-containing interpolymers have a RSV from about 0.2, or about 0.35 to about 0.9, or to about 0.7.

Mixtures of two or more compatible (i.e., nonreactive to one another) interpolymers which are separately prepared are contemplated for use herein. When mixtures of two or more compatible interpolymers are used in the present invention, the RSV of the combined mixture is determined as described above. Thus, as used herein, and in the appended claims, the terminology "interpolymer" refers to either one separately prepared interpolymer or a mixture of two or more of such interpolymers.

As described above, the olefin may be reacted with an alpha, beta-unsaturated carboxylic acylating agent to form the carboxy-containing interpolymers used in the present invention. Generally, from about 0.75, or about 1, up to about 5, or to about 2.5 moles of olefin is reacted with each mole of alpha, beta-unsaturated carboxylic acylating agent. In one embodiment, equal molar proportions of olefin and carboxylic acylating agent are polymerized.

Particularly preferred carboxy-containing interpolymers useful in this invention are those of interpolymers made by reacting a maleic acylating agent with styrene. Copolymers of maleic anhydride and styrene having a molar ratio of the maleic anhydride to styrene of about 1:1 are especially useful. They can be prepared according to methods known in the art, as for example, free radical polymerization, such as those initiated by benzoyl peroxide solution. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; and 3,723,375. These patents are incorporated herein by reference for their teaching of the preparation of suitable carboxy-containing interpolymers and also suitable styrene-maleic anhydride interpolymers, as well as esters prepared from the interpolymers. Polymerization of alpha-olefins and alpha, beta-unsaturated carboxylic acylating agents is described in U.S. Pat. No. 4,526,950, the disclosure of which is hereby incorporated by reference. Other preparative techniques are known in the art.

The carboxy-containing interpolymers may also be prepared using a interpolymerizable comonomer. The interpolymerizable comonomer is present in relatively minor portions. Generally, the amount is less than about 0.3 mole, usually less than about 0.15 moles of interpolymerizable comonomer for each mole of either the olefin or the alpha, beta-unsaturated carboxylic acylating agent. The interpolmerizable comonomers do not interfere with the polymerization of the olefin and the alpha, beta-unsaturated carboxylic acylating agent. Examples of interpolymerizable comonomers include acrylamides, acrylonitrile, vinyl pyrrolidinone, vinyl pyridine, vinyl ethers, vinyl carboxylates, and acrylic and methacrylic acids and esters. In one embodiment, the interpolymerizable comonomers are vinyl ethers, vinyl carboxylates, or acrylic and methacrylic acids and esters, preferably the lower alkyl acrylic or methacrylic esters, e.g., those containing from 1 to about 7 carbon atoms. When the interpolymerizable comonomer is an acrylic acid or methacrylic acid, it should be recognized that the acid may be esterified to form ester groups as is described herein.

The vinyl ether is represented by the formula $R_1-CH_2=CH-OR_2$ wherein each $R_1$ is hydrogen or a hydrocarbyl group having 1 to about 30, or to about 24, or to about 12 carbon atoms and $R_2$ is a hydrocarbyl group having 1 to about 30 carbon atoms, or to about 24, or to about 12. Examples of vinyl ethers include vinyl methylether, vinyl propylether, vinyl 2-ethylhexylether and the like.

The vinyl ester of a carboxylic acid may be represented by the formula $R_3CH=CH-O(O)CR_4$ wherein $R_3$ is a hydrogen or hydrocarbyl group having from 1 to about 30, or to 12 carbon atoms, or just hydrogen, and $R_4$ is a hydrocarbyl group having 1 to about 30, or to about 12, or to about 8. Examples of vinyl esters include vinyl acetate, vinyl 2-ethylhexanoate, vinyl butanoate, vinyl crotonate. Vinyl carboxylates include vinyl acetate, vinyl butanoate, etc.

The carboxy-containing interpolymers contain ester groups. In one embodiment, the ester groups are formed by reacting the carboxy-containing interpolymer with an alcohol. The alcohol generally contains at least 6 carbon atoms. In one embodiment, the alcohol contains from about 7, or about 8 to about 30, or to about 24, or even to about 18 carbon atoms. Examples of useful alcohols include heptanol, octanol, decanol, dodecanol, tridecanol, pentadecanol, octadecanol, etc.

One class of alcohols includes the commercially available mixtures of alcohols. The commercial alcohols includes, the oxoalcohols which comprise, for example, a mixture of alcohols having from about 8-24 carbon atoms. Of the various commercial alcohols, another class of alcohols includes the alcohols having from about 8 to 30 aliphatic carbon atoms. The alcohols may comprise, for example, octyl alcohol, decyl alcohol, dodecyl alcohol, tetradecyl alcohol, pentadecyl alcohol, eicosyl alcohol, octadecyl alcohol, etc. Several suitable sources of these alcohol mixtures are the technical grade alcohols sold under the name Neodol TM alcohols (Shell Oil Company, Houston, Tex. and under the name Alfol TM alcohols (Continental Oil Company, Ponca City, Okla.

In one embodiment, the esters are mixed esters derived from a combination of alcohols including alcohols containing at least 8 carbon atoms (relatively high molecular alcohols) and alcohols containing less than 7 carbon atoms (relatively low molecular weight alcohols). The alcohols containing less than 7 carbon atoms generally contain from 1, or about 2, to about 6, or to about 5 carbon atoms. Examples of the low molecular weight alcohols include methanol, ethanol, propanol, butanol, pentanol, hexanol, cyclopentanol, and cyclohexanol. The above list is also meant to include the various isomeric arrangements of these alcohols. For instance, butanol refers to n-butanol, isobutanol, etc.

Mixed esters of the carboxy-containing interpolymer are most conveniently prepared by first esterifying the carboxy-containing interpolymer with a relatively high molecular weight alcohol and a relatively low molecular weight alcohol to convert at least about 50%, or about 70% up to about 95%, or to about 98% of the carboxy groups of the interpolymer to ester groups and then neutralizing the remaining carboxy groups with an amine or a hydrazine such as those described below to obtain nitrogen-containing esters.

To incorporate the appropriate amounts of the two alcohol groups into the polymer to form mixed esters, the ratio of the high molecular weight alcohol to the low molecular weight alcohol used in the process should be within the range of from about 2:1 to about 9:1 on a molar basis. In most instances, the ratio is from about 2.5:1 to about 5:1.

The esterification may be accomplished simply by heating the carboxy-containing interpolymer and the alcohol or alcohols under conditions typical for affecting esterification. Such conditions usually include, for example, a temperature of at least about 80° C., or about 150° C. to about 350° C., provided that the temperature is maintained below the decomposition point of the reaction mixture or individual components of the mixture. An excess of the alcohol reactant; a solvent or diluent, such as mineral oil, toluene, benzene, xylene or the like; and an esterification catalyst, such as toluene sulfonic acid, sulfuric acid, aluminum chloride, boron trifluoride-triethylamine, hydrochloric acid, ammonium sulfate, phosphoric acid, sodium methoxide or the like, may be used to facilitate the esterification. The reaction conditions and variations thereof are well known in the art.

When utilizing a combination of a high molecular weight alcohol and a low molecular weight alcohol, the esterification may be carried out, for example, by initially esterifying at least about 50 molar percent or from about 50 to 75 molar percent of the carboxy radicals with the high molecular weight alcohol and then subsequently esterifying the partially-esterified carboxy-containing interpolymer with a low molecular weight alcohol, e.g., 2–4 carbon atoms, to obtain a carboxy interpolymer having approximately 50–75 molar percent of the carboxylic groups esterified with the high molecular weight aliphatic alcohol and approximately 23–48 molar percent of the carboxy radicals esterified with the low molecular weight aliphatic alcohol. For example, esterification with a combination of high and low molecular weight alcohols may be accomplished, in sequence, by first carrying out the esterification with the high molecular weight alcohol, e.g., up to about 75 molar percent and subsequently esterifying the remaining carboxylic groups with the low molecular weight alcohol, where up to 98 molar percent of all carboxylic groups are esterified.

Alternatively, the carboxylic groups of the interpolymer may be simultaneously esterified with a mixture of the alcohols to obtain an esterified-carboxy containing interpolymer having up to about 60, or to about 70, or to about 80, or to about 90, or to about 95 or to about 98 mole percent of the carboxylic groups esterified with combination of high and low molecular weight aliphatic alcohols.

In another embodiment, the carboxy-containing interpolymers contains a carbonyl-amino group. The carbonyl-amino groups include amides, imides, amidines, ammonium salts, amidic acid salts or mixtures thereof. A carbonyl-amino group is derived from the carboxy group of the carboxy-containing interpolymer and an amine. The carbonyl-amino group may be present when the carboxy-containing interpolymer contains esters derived from a single alcohol or mixtures of alcohol as described above.

In one embodiment, the unesterified carboxylic groups of the interpolymer may be converted to carbonyl-amino groups by reaction with ammonia or an amine. The amines which are used to form carbonyl-amino group may be mono- or polyamines. Examples of amines include aliphatic amines such as mono-, di- and tri-alkyl amines having alkyl groups containing from 1 to about 20 carbon atoms as well as cyclic monoamines. In one embodiment, the amines have one primary or secondary amino group and at least one mono-functional amino group such as a tertiary-amino or heterocyclic amino group.

Examples of amines having one primary or secondary amino group and at least one mono-functional amino group such as tertiary-amino or heterocyclic amino groups. Such compounds may thus be tertiary-amino-substituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxacarbamyl, thiocarbamyl, uracils, hydantoins, thiohydantoins, guanidines, ureas, sulfonamides, phosphoramides, phenolthiazines, amidines, etc.

The carbonyl-amino group may also be a carbonyl-polyamino group. In this instance, the carbonyl-polyamino group is derived from a polyamine. In one embodiment, the carbonyl-polyamino group is derived from a morpholine. Examples of morpholines include aminoethylmorpholine, aminopropylmorpholine, etc. Examples of such polyamines include dimethylaminoethylamine, dibutylamino-ethylamine, 3-dimethylamino-1-propylamine, 4-methylethylamino-1-butylamine, pyridyl-ethylamine, N-morpholinoethylamine, tetrahydropyridyl-ethylamine, bis-(dimethylamino)propylamine, bis(diethylamino)ethylamine, N,N-dimethyl-p-phenylene diamine, piperidyl-ethylamine, 1-aminoethylpyrazone, 1-(methylamino)pyrazoline, 1-methyl-4-aminooctyl pyrazole, 1-aminobutylimidazole, 4-aminoethylthiazole,2-aminoethyltriazine, dimethylcarbamylpropylamine, N-methyl-N-aminopropylacetamide, N-aminoethylsuccinimide, N-methylaminomaleimide, N-aminobutylalphachlorosuccinimide, 3-aminoethyluracil, 2-aminoethylpyridine, ortho-aminoethyl-N,N-dimethylbenzenesulfamide, N-aminoethylphenothiazine, N-aminoethylacetamidine, 1-aminophenyl-2-methyl-imidazoline, N-methyl-N-aminoethyl-S-ethyldithiocarbamate, etc. For the most part, the amines are those which contain only one primary-amino or secondary-amino group and, preferably at least one tertiary-amino group. The tertiary amino group is preferably a heterocyclic amino group. In some instances polyamines may contain up to about 6 amino groups although, in most instances, they contain one primary-amino group and either one or two tertiary-amino groups. The polyamines may be aromatic or aliphatic amines and are preferably heterocyclic amines such as aminoalkyl-substituted morpholines, piperazines, pyridines, benzopyrroles, quinolines, pyrroles, etc. They are usually amines having from 4 to about 30, or to about 12 carbon atoms. Polar substituents may likewise be present in the amines.

The carbonyl-amino groups of the carboxy-containing interpolymers also may comprise the groups derived from hydrazine and/or a hydrocarbon-substituted hydrazine including, for example, the mono-, di-, tri-, and tetrahydrocarbon-substituted hydrazines wherein the hydrocarbon substituent is either an aliphatic or aromatic substituent including, for example, the alkyl-, e.g., cyclic and/or acyclic groups, aryl-, alkylaryl-, aralkyl, etc. The hydrocarbon substituents, generally, contain from 1, up to about 24, or to about 12 aliphatic carbon atoms. The preferred substituents, however, include for example, phenyl, alkylphenyl or an alkyl group wherein the alkyl group is either a methyl, ethyl, propyl, butyl, pentyl, octyl, cyclohexyl, decyl or dodecyl group. Other examples of the hydrocarbon groups include octyldecyl, behenyl, benzyl, heptaphenyl, alpha-naphthyl, beta-naphthyl, butyl-naphthyl, oleyl, and stearyl groups. Of the various hydrocarbon-substituted hydrazines, a preferred class includes the N,N-dihydrocarbon-substituted hydrazines, e.g., the dimethyl, diethyl, diphenyl and dibutyl hydrazines.

In the embodiment where the carboxy-containing interpolymer is characterized as containing a carbonyl-amino group, the carboxy-containing interpolymer may be esterified as described above. Following esterification of the carboxy groups of the interpolymer with either one or more of the high and low molecular weight alcohols, at least about 2 molar percent, or from about 2, or about 5, up to 50, or to about 5 molar percent of the carboxy groups of the interpolymer may be reacted with an amine at temperatures ranging from about 80°-300° C. The reaction temperatures may range from about 80° C. to 350° C. or higher provided that said temperature is maintained below the decomposition point of either the reactants and the products obtained thereof. Thus, for example, at least about 50 mole percent, e.g., 50-98 mole percent, of the carboxy groups of a carboxy-containing interpolymer may be esterified with a high molecular weight aliphatic alcohol and then subsequently reacted with a amine, to obtain a nitrogen-containing ester having about 2 to about 50 or to about 35 molar percent of the carboxylic groups converted to carbonyl-amino groups. If a mixture of alcohols including the high molecular weight and low molecular weight alcohols is used to esterify the carboxyl groups of said interpolymer, then at least about 2 molar percent of the carboxyl groups of said interpolymer are reacted with the amine, to obtain the carbonyl-amino groups. The amount of amine is sufficient to neutralize substantially all of the unesterified carboxy groups of the polymer. An excess of amine may be used.

In another embodiment, the carboxy-containing interpolymer is reacted with a relatively high molecular weight alcohol, a relatively low molecular weight alcohol and an amine. The alcohols and amines have been described above. The alcohols may be reacted with the interpolymer to form an intermediate which is subsequently reacted with the amine. Alternatively the alcohols and amine may be reacted with the interpolymer simultaneously. For convenience, the relative proportions of the high molecular weight ester group to the low molecular weight ester group and to the carbonyl-amino group are expressed in terms of molar ratios of (60–90):(10–30):(2–15), respectively. The preferred ratio is (70–80):(15–25):5.

The following examples serve to illustrate the preparation of the esters and nitrogen-containing esters of the carboxy-containing interpolymers used in this invention and are not intended as limiting thereof. Unless otherwise indicated in these and the following examples, or in the specification, all parts and percentages are by weight, and temperatures are in degrees Celsius.

EXAMPLE 1

A styrene-maleic interpolymer is obtained by preparing a solution of styrene (16.3 parts by weight) and maleic anhydride (12.9 parts) in a benzene-toluene solution (270 parts; weight ratio of benzene:toluene being 66.5:33.5) and contacting the solution at 86° C. in nitrogen atmosphere for 8 hours with a catalyst solution prepared by dissolving 70% benzoyl peroxide (0.42 part) in a similar benzene-toluene mixture (2.7 parts). The resulting product is a thick slurry of the interpolymer in the solvent mixture. To the slurry there is added mineral oil (141 parts) while the solvent mixture is being distilled off at 150° C. and then at 150° C./200 mm. Hg. To 209 parts of the stripped mineral oil-interpolymer slurry (the interpolymer having a reduced specific viscosity of 0.72) there are added toluene (25.2 parts), n-butyl alcohol (4.8 parts), a commercial alcohol consisting essentially of primary alcohols having from 12 to 18 carbon atoms (56.6 parts) and a commerical alcohol consisting of primary alcohols having from 8 to 10 carbon atoms (10 parts) and to the resulting mixture there is added 96% sulfuric acid (2.3 parts). The mixture is then heated at 150°-160° C. for 20 hours whereupon water is distilled off. An additional amount of sulfuric acid (0.18 part) together with an additional amount of n-butyl alcohol (3 parts) is added and the esterification is continued until 95% of the carboxy radicals of the polymer has been esterified. To the esterified interpolymer, there is then added aminopropyl morpholine (3.71 parts; 10% in excess of the stoichiometric amount required to neutralize the remaining free carboxy radicals) and the resulting mixture is heated to 150°-160° C./10 mm. Hg to distill off toluene and any other volatile components. The stripped product is mixed with an additional amount of mineral oil (12 parts) and filtered. The filtrate is a mineral oil solution of the nitrogen-containing mixed ester having a nitrogen content of 0.16-0.17%.

EXAMPLE 2

The procedure of Example 1 is followed except that the esterification is carried out in two steps, the first step being the esterification of the styrene-maleic interpolymer with the commercial alcohols having from 8 to 18 carbon atoms and the second step being the further esterification of the interpolymer with n-butyl alcohol.

EXAMPLE 3

The procedure of Example 1 is followed except that the esterification is carried out by first esterifying the styrene-maleic interpolymer with the commercial alcohols having from 8 to 18 carbon atoms until 70% of the carboxyl radicals of the interpolymer have been converted to ester radicals and thereupon continuing the esterification with any yet-unreacted commercial alcohols and n-butyl alcohol until 95% of the carboxyl radicals of the interpolymer have been converted to ester radicals.

EXAMPLE 4

The procedure of Example 1 is followed except that the interpolymer is prepared by polymerizing a solution consisting of styrene (416 parts), maleic anhydride (392 parts) in benzene (2153 parts) and toluene (5025 parts) in the presence of benzoyl peroxide (1.2 parts) at 65°–106° C. The resulting interpolymer has a reduced specific viscosity of 0.45.

EXAMPLE 5

The procedure of Example 1 is followed except that the styrene-maleic anhydride is obtained by polymerizing a mixture of styrene (416 parts), maleic anhydride (392 parts), benzene (6101 parts) and toluene (2310 parts) in the presence of benzoyl peroxide (1.2 parts) at 78°–92° C. The resulting interpolymer has a reduced specific viscosity of 0.91.

EXAMPLE 6

The procedure of Example 1 is followed except that the styrene-maleic anhydride is prepared by the following procedure: Maleic anhydride (392 parts) is dissolved in benzene (6870 parts). To this mixture there is added styrene (416 parts) at 76° C. whereupon benzoyl peroxide (1.2 parts) is added. The polymerization mixture is maintained at 80°–82° C. for about 5 hours. The resulting interpolymer has a reduced specific viscosity of 1.24.

EXAMPLE 7

The procedure of Example 1 is followed except that the styrene-maleic anhydride interpolymer is prepared as follows: To a solution of maleic anhydride (69 parts) in benzene (805 parts) at 50° C. there is added styrene (73 parts). The resulting mixture is heated to 83° C. whereupon benzoyl peroxide (0.19 part) is added and then maintained at 80°–85° C. The resulting interpolymer has a reduced specific viscosity of 1.64.

EXAMPLE 8

The procedure of Example 1 is followed except that dodecyl alcohol (0.7 mole per carboxy equivalent of the styrene-maleic anhydride interpolymer) is used in place of the alcohol mixtures having 8 to 18 carbon atoms and isobutyl alcohol (0.2 mole per carboxy equivalent of the interpolymer) is used in place of n-butyl alcohol.

EXAMPLE 9

The procedure of Example 1 is followed except that eicosyl alcohol (0.8 mole consumed per carboxy equivalent of interpolymer) is used in place of the commercial alcohols having from 8 to 18 carbon atoms and n-pentyl alcohol (0.15 mole consumed per carboxy equivalent of the interpolymer) is used in place of n-butyl alcohol.

EXAMPLE 10

The procedure of Example 1 is followed except that dimethylaminoethylamine is substituted for the aminopropyl morpholine used on a molar basis.

EXAMPLE 11

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.77 mole; comprising primary alcohols having from 8 to 18 carbon atoms) at 150°–160° C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with aminopropyl morpholine (slight excess of the stoichiometric amount to neutralize the free carboxyl radicals of the interpolymer) at 150°–160° C. until the resulting product is substantially neutral (acid number of 1 to phenolphthalein indicator). The resulting product is mixed with mineral oil to form an oil solution containing 34% of the polymeric product.

EXAMPLE 12

The procedure of Example 1 is followed except a 64% aqueous solution of hydrazine is used instead of amino-morpholine and 126 parts of mineral oil is used instead of 12 parts of mineral oil.

EXAMPLE 13

The procedure of Example 11 is followed N,N-dibutylhydrazine is used instead of aminopropylmorpholine.

EXAMPLE 14

Toluene (690 parts) is preheated to 65°–68° C. and charged to a reactor. A mixture of 45.8 parts maleic anhydride and 48.64 parts of styrene is charged to the reactor and mixed with the toluene to form a homogeneous mixture. The temperature is adjusted to 60° C. at 140–150 mm. Hg. A catalyst solution containing 0.1 part of bis(4-t-butylcyclohexyl) peroxydicarbonate in 7.2 parts of toluene is added to the reactor over 1.5–2.0 hours. The reaction is held at 59°–63° C. at 100–150 mm. Hg. After addition of the catalyst is complete, the reaction mixture is held for 4 hours. Typical conversion is 95–96%. The copolymer is present as a slurry in toluene. The copolymer slurry is transferred to a stripping vessel containing 381.6 parts of mineral oil. The toluene is stripped to 107° C. and 50 mm. Hg.

A reaction vessel containing 562.2 parts the copolymer diluent mixture containing about 90.6 parts copolymer in 381.6 parts diluent oil and about 90 parts toluene is charged with 22 parts of a commercial $C_6$–$C_{12}$ alcohol mixture and 125 parts of a commercial $C_{10}$–$C_{20}$ alcohol mixture. Sulfuric acid catalyst (2.2 parts) is added to the reactor. The reaction is held at 148°–157° C. The water of reaction is removed azeotropically. When about 75% of the copolymer has been esterified, 12 parts of n-butanol mixed with 0.25 part sulfuric acid is added and the reaction is continued until 85% of the copolymer has been esterified. An additional 12 parts of n-butanol is added and the reaction is continued to 95% conversion. The remaining unesterified copolymer is reacted with about 7-7.5 parts aminopropyl morpholine. The reaction is stripped to 146° C. and 45-55 mm. Hg. until a Pensky-Marten flash point of 70° C. is achieved. The stripped material is filtered at 121° C. with a diatomaceous earth filter aid. The filtered product is mixed with 72 parts of diluent oil. The resulting product contains about 0.13% nitrogen and about 34% esterified polymer.

EXAMPLE 15

An interpolymer is prepared by reacting (while maintaining the temperature between 99°-105° C.) styrene (536 parts) and maleic anhydride (505 parts) in toluene (7.585 parts) in the presence of a catalyst solution prepared by dissolving benzoyl peroxide (1.5 parts) in toluene (50 parts). The toluene is removed by vacuum stripping as mineral oil (2.228 parts) is added. The oil solution obtained in this manner contains 55.4% oil. The resulting interpolymer (free of oil) has a RSV of 0.42.

A mixture of 561 parts of a behenyl alcohol mixture available from Henkel (a mixture of 17.4 mole percent of $C_{18}$ primary alkanol, 15.6 mole percent of $C_{20}$ primary alkanol and 67 mole percent of $C_{22}$ primary alkanol), and 668 parts of the above-prepared interpolymer oil solution is heated to a temperature of about 105° C. over a period of 3.5 hours in a nitrogen atmosphere. Methane sulfonic acid (5.1 parts of a 70% aqueous solution) is added at this temperature in 6 minutes whereupon the temperature is raised to about 150° C. over a period of about 50 minutes and 60 parts of toluene is added to maintain reflux. The solution is maintained at 150°-156° C. for 5.5 hours. An additional 7 parts of methane sulfonic acid solution is added over a period of about 9 minutes. The mixture is maintained at 150°-155° C. for about 9 hours, and some water is removed by distillation. The reaction mixture is then stripped at 130°-155° C. for 1 hour under a vacuum of about 10 torr. The residue is the desired product having a neutralization acid number of 3.0 (phenolphthalein) and 1.9 (bromphenolblue). Neutralization number is determined by ASTM Method D 974.

EXAMPLE 16

To 375 parts of the alcohol mixture of Example 15 is added 445 parts of the interpolymer oil solution of Example 38, and this mixture is heated up to a temperature of about 105° C. over a period of 3 hours in a nitrogen atmosphere. Sulfuric acid (1.4 parts, 93%) is added at this temperature over a period of about 6 minutes followed by heating of the mixture to 150° C. over a period of about 40 minutes. Toluene (40 parts) is added, and the solution is maintained at a temperature of about 150°-155° C. for 5.5 hours with a nitrogen purge. An additional 1.9 parts of sulfuric acid is added at this temperature in 6 minutes, and the reaction mixture is maintained at 150°-155° C. for 9.5 hours while removing water by distillation. An additional gram of sulfuric acid is added, and the mixture is again maintained at 150°-155° C. for 3 hours. The reaction mixture then is stripped at 130°-155° C. over a period of 1 hour under a vacuum of 10 torr. The residue is the desired product. The product obtained in this manner has a neutralization number to phenolphthalein of 2.9 acid and to bromphenol blue of 0.9 acid.

COMPOSITIONS

The compositions of the present invention include a mixture of a brine and a liquid hydrocarbon, and (A) the esters of the carboxy-containing interpolymers and optionally (B) weighting agents, (C) organophilic clays and (D) surfactants and (E) line.

BRINE-LIQUID MIXTURES

The brine is present in a mixture with a liquid hydrocarbon. In one embodiment, the brine is present in the mixture in an amount from about 5, or about 10, or about 15, or about 25 up to about 90, or to about 75, or to about 55 parts by volume. In this embodiment, the liquid hydrocarbon is present in the mixture in an amount from about 10, or about 25, or about 45 up to about 95, or to about 90, or to about 85, or to about 75 parts by volume. The total parts by volume of brine plus the total parts by volume of liquid hydrocarbon is 100 parts by volume of the mixture. In one embodiment, the brine is a discontinuous phase and the liquid hydrocarbon is a continuous phase. In another embodiment, the mixture contains a major amount of a liquid hydrocarbon, preferably from about 65, or about 70, or about 75 up to about 90, or to about 85 parts by volume. In this embodiment, the brine is present in an amount from about 10, or about 15 up to about 35, or about 20, or about 25 parts by volume of the mixture.

The brine useful in the compositions and methods of the present invention may be naturally occurring field brine or one formulated by various salts. The salts include calcium chloride, magnesium chloride, sodium chloride and potassium chloride. The calcium chloride is generally present in an amount from 1% to about 40% by weight of the brine. The magnesium chloride is generally present in an amount from about 0.5% to about 24% by weight of the brine. The sodium chloride is generally present in an amount from about 1% to about 27% by weight of the brine. The potassium chloride is present in an amount from about 0.5% to about 24% by weight of the brine.

The mixture also includes a liquid hydrocarbon. Examples of these hydrocarbons include petroleum oils, such as oils of lubricating viscosity, crude oils, diesel oils, mineral seal oils, kerosenes, fuel oils, white oils, and aromatic oils. Oils of lubricating viscosity include natural synthetic lubricating oils, such as animal oils, vegetable oils, mineral lubricating oils, solvent or acid treated mineral oils, and oils derived from coal or shale. In one embodiment, the liquid hydrocarbon is a mineral or vegetable oil having a kinematic viscosity from about 3, or about 3.5, or about 4 up to about 15, or to about 11, or to about 10, or to about 9 centistokes at 100° C. Useful mineral oils include 40, 100, 150, 200 and 300 neutral mineral oils. Examples of specific liquid hydrocarbons include No. 2 diesel oil, Exxon ESCAID 110, Total HDF 200, Conoco LVT oil (a mineral oil with the viscosity of 1.8 centistokes at 40° C. available from Conoco Oil Company), and Conoco LVT 200 (a mineral oil with a viscosity of 2.1 centistokes at 40° C. and less than 0.5% aromatic content, available from Conoco Oil Company).

(B) Weighting Agents

The compositions of the present invention may additionally contain weighting agents. These agents increase density of drilling muds and include galena (PbS), hematite ($Fe_2O_3$), magnetite ($Fe_3O_4$), ilmenite ($FeTiO_3$), barite ($BaSO_4$), siderite ($FeCO_3$), celestite ($SrSO_4$), dolomite ($CaMg(CO_3)_2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 900, or to about 700, or to about 600. In one embodiment, the weighting agent is present in an amount from about 300 to about 500, or about 400 pounds per barrel (ppb).

(C) Organophilic Clays

The compositions may also contain commercial clays such as bentonite, attapulgite, sepiolite, etc. In one embodiment, the compositions may also include an organophilic clay. Organophilic clays are clays, such as montmorillonite, hectorite, saponite, attapulgite and illite, that have absorbed amine salts. These clays are converted from water-yielding (e.g., present in the brine phase of the emulsion) to oil-yielding (e.g., present in the liquid hydrocarbon phase) clays by the absorption of amine salts. Organophilic clays are preferably oil-wetable and are dispersed in the oil phase to produce viscosity and gel properties. Montmorillonite, bentonite and attapulgite are preferred, with mortmorillonite more preferred. Water and methanol may be used to activate the organophilic clay. The organophilic clay is present in an amount from about 1, or about 2 up to about 10, or about 8 pounds per barrel (ppb).

(D) Surfactants

The surfactant is generally present in the compositions in an amount from about 1, or about 2 up to about 20, or to about 15, or to about 10 pounds per barrel of the composition.

The surfactants include polyoxyalkylene amines, polyoxyalkylene amides, polyoxyalkylene alcohols, polyoxyalkylene phenols, polyoxyalkylene esters, fatty acid salts, amine or alkaline earth or transition metal sulfonates, or reaction products of a hydroxyamine or a polyalkylenepolyamine with an acylating agent selected from the group consisting of a fatty monocarboxylic acylating agents, a dicarboxylic acylating agent other than a succinic acylating agent, and a tricarboxylic acylating agent.

Any of the above described polyoxyalkylene amines, including the Jeffamine polyoxyalkylene amines may be used as surfactants in the present invention.

In another embodiment, the polyoxyalkylene amine may be represented by the formula

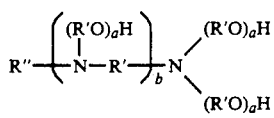

wherein each R' is described above, R" is a hydrocarbyl group; each a is independently an integer from zero to 100, provided at least one a is an integer greater than zero; and b is zero or one.

In one embodiment, R" is a hydrocarbyl group having from 8, or about 10 to about 30 carbon atoms, or to about 24, or to about 18 carbon atoms. R" may be an alkyl or alkenyl group. R" is preferably an octyl, decyl, dodecyl, tridecyl, tetradecyl, hexadecyl, octadecyl, oleyl, soya or tallow group.

a is typically 1, or about 2, or about 3 to about 100, or to about 50, or to about 10.

The above amines can be prepared by techniques well known in the art, and many such amines are commercially available. They may be prepared, for example, by reaction of primary amines containing at least 6 carbon atoms with various amounts of alkylene oxides such as ethylene oxide, propylene oxide, etc. The primary amines may be single amines or mixtures of amines such as obtained by the hydrolysis of fatty oils such as tallow oils, sperm oils, coconut oils, etc. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

A number of hydroxyamines wherein b is zero are available from the Armak Chemical Division of Akzona, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen O/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively. "Propomeen O/12" is the condensation product of one mole of oleyl amine with 2 moles propylene oxide. Preferably, the salt is formed from Ethomeen C/15 or S/15 or mixtures thereof.

Commercially available examples of amines where b is 1 include "Ethoduomeen T/13", "T/20" and "T/25" which are ethylene oxide condensation products of N-tallow trimethylene diamine containing 3, 10 and 15 moles of ethylene oxide per mole of diamine, respectively.

Another group of polyoxyalkylene amines are the commercially available liquid TETRONIC polyoxyalkylated amine polyols sold by Wyandotte Chemicals Corporation. These amines are represented by the general formula:

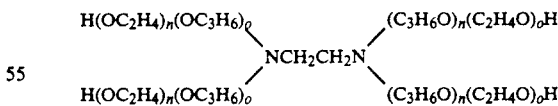

Such hydroxyamines are described in U.S. Pat. No. 2,979,528 which is incorporated herein by reference. In one embodiment, the hydroxyamines corresponding to the above formula have a number average molecular weight of up to about 10,000 wherein the ethyleneoxy groups contribute to the total number average molecular weight in the percentage ranges discussed above. A specific example would be such a hydroxyamine having a number average molecular weight of about 8000 wherein the ethyleneoxy groups account for 7.5%–12% by weight of the total number average molecular weight. Such hydroxyamines can be prepared by reacting an alkylenediamine, such as ethylenediamine, propylenediamine, hexamethylenediamine etc., with propylene oxide. Then the resulting product is reacted with ethylene oxide.

In another embodiment, the polyoxyalkylated amine is a propoxylated hydrazine. Propoxylated hydrazines are available commercially under the tradename Qxypruf ™. Examples of propoxylated hydrazines include Qxypruf ™ 6, 12 and 20 which are hydrazine treated with 6, 12 and 20 moles of propylene oxide, respectively.

In another embodiment, the surfactant is a polyoxyalkylated fatty amide. Preferably the fatty amide is polyoxypropylated or polyoxyethylated, more preferably polyoxyethylated. Examples of fatty amides which may be polyoxyalkylated include oleylamide, stearylamide, tallowamide, soyaamide, cocoamide, and laurylamide. Polyoxyalkylated fatty amides are available commercially from Armak Company under the trade name Ethomid ™ and Lonza, Inc., under the tradename Unamide ®. Specific examples of these polyoxyalkylated fatty amides include Ethomid ™ HT/15 and HT/60, which are hydrogenated tallow acid amides treated with 5 and 50 moles of ethylene oxide respectively; Ethomid ™ O/15, which is an oleic amide treated with 5 moles of ethylene oxide; Unamide ® C-2 and C-5, which are cocamides treated with 2 and 5 moles of ethylene oxide, respectively; and Unamide ® L-2 and L-5, which are lauramides treated with 2 and 5 moles of ethylene oxide, respectively.

In another embodiment the surfactant is a polyoxyalkylene alcohol, e.g., a polyalkylated alcohol. A variety of polyoxyalkylene alcohols are known in the art, and many are available commercially. The polyoxyalkylene alcohols are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol.

The polyoxyalkylene alcohols useful in the present invention are available commercially under such trade names as "TRITON ®", "CARBOWAX ®" and "TERGITOL ®" from Union Carbide Chemical Company, "ALFONIC ®" from Conoco Chemicals Company, and "NEODOL ®" from Shell Chemical Company. The TRITON ® materials are identified generally as polyethoxylated alcohols or phenols. The TERGITOLS ® are identified as polyethylene glycol ethers of primary or secondary alcohols; the ALFONIC ® materials are identified as ethoxylated linear alcohols which may be represented by the general structural formula

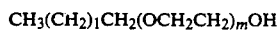

wherein l varies between 5 and 17 and m is a number between about 3 and 11. Specific examples of ALFONIC ® ethoxylates characterized by the above formula include ALFONIC ® 1012-60 wherein l is about 8 to 10 and m is an average of about 5 to 6; ALFONIC ® 1214-70 wherein l is about 10-12 and m is an average of about 10 to about 11; ALFONIC ® 1412-60 wherein l is from 10-12 and m is an average of about 7; and ALFONIC ® 1218-70 wherein l is about 10-16 and m is an average of about 10 to about 11.

The Carbowax ® methoxy polyethylene glycols are linear ethoxylated polymer of methanol. Examples of these materials include Carbowax ® methoxy polyethylene glycol 350, 550 and 750, wherein the numerical value approximates number average molecular weight.

The NEODOL ® ethoxylates are ethoxylated alcohols wherein the alcohols are a mixture of alcohols containing from 12 to about 15 carbon atoms, and the alcohols are partially branched chain primary alcohols. The ethoxylates are obtained by reacting the alcohols with an excess of ethylene oxide such as from about 3 to about 12 or more moles of ethylene oxide per mole of alcohol. For example, NEODOL ® ethoxylate 23-6.5 is a partially branched chain alcoholate of 12 to 13 carbon atoms with an average of about 6 to about 7 ethoxy units.

The polyoxyalkylene alcohol may be a polyoxyalkylene glycol. The polyoxyalkylene glycols may be polyoxyethylene glycols or polyoxypropylene glycols. Useful polyoxyethylene glycols are available from Union Carbide under the trade name Carbowax ® PEG 300, 600, 1000 and 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide Chemical Company under the trade name NIAX 425; and NIAX 1025. Useful polyoxypropylene glycols are available from Dow Chemical and sold by the trade name PPG-1200, and PPG-2000.

Representative of other useful polyoxyalkylene polyols are the liquid polyols available from Wyandotte Chemicals Company under the name PLURONIC Polyols and other similar polyols. These PLURONIC Polyols correspond to the formula

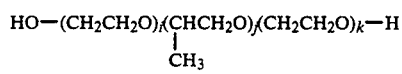

wherein i, j, and k are integers greater than one such that the —CH$_2$CH$_2$O—groups comprise from about 10% to about 15% by weight of the total number average molecular weight of the glycol, the number average molecular weight of said polyols being from about 2500 to about 4500. This type of polyol can be prepared by reacting propylene glycol with propylene oxide and then with ethylene oxide. A particularly useful polyoxyalkylene polyol is Pluracol ® V-10 which is a polyoxyalkylene derivative of trimethylol propane having a molecular weight of about 22,000. This material is available commercially from BASF Corporation, Parsippany, N.J., U.S.A.

In another embodiment, the surfactant is a polyoxyalkylated phenol. The phenol may be substituted or unsubstituted. A preferred polyoxyalkylated phenol is a polyoxyethylated nonylphenol. Polyoxyalkylated phenols are available commercially from Union Carbide Chemical Company under the tradename Triton ® and Texaco Chemical Company under the tradename Surfonic ®. Examples of polyoxyalkylated phenols include Triton ® AG-98, N series, and X series polyoxyethylated nonylphenols.

In another embodiment, the surfactant is a polyoxyalkylene fatty ester. Polyoxyalkylene fatty esters may be prepared from any polyoxyalkylene polyol or an polyoxyalkylene alcohol and a fatty acid. The polyoxyalkylene polyol and the polyoxyalkylene alcohol, e.g., polyoxyalkylated alcohol or phenol, are disclosed above. The fatty acid is preferably the fatty monocarboxylic acid described above. Polyoxyalkylene fatty esters are available commercially from Armak Company under the tradename Ethofat TM. Specific examples of polyoxyalkylene fatty esters include Ethofat TM C/15 and C/25, which are coco fatty esters formed using 5 and 15 moles, respectively, of ethylene oxide; Ethofat TM O/15 and O/20, which are oleic esters formed using 5 and 10 moles of ethylene oxide; and Ethofat 60/15, 60/20 and 60/25 which are stearic esters formed with 5, 10 and 15 moles of ethylene oxide respectively.

In one embodiment, the surfactant is a tall oil, such as distilled tall oil available from Union Camp under the tradename Unitol.

In another embodiment, the surfactant is the reaction product of a hydroxyamine or a polyalkylene polyamine with a carboxylic acylating agent selected from the group consisting of monocarboxylic acylating agents, dicarboxylic acylating agents other than succinic acylating agents and tricarboxylic acylating agents. Monocarboxylic acylating agents include fatty carboxylic acylating agents such as fatty acids and reaction products of olefins and alpha, beta-unsaturated carboxylic acylating agents. The fatty acids generally contain from about 8, or about 10, or about 12 to about 30, or to about 24 carbon atoms. Examples of fatty acids include stearic, oleic, lauric, linoleic, abietic, palmitic, sebacic, linolenic, behenic, tall oil and rosin acids.

The monocarboxylic acylating agents may also be the reaction product of an $\alpha,\beta$-unsaturated carboxylic acylating agent (e.g., acrylic or methacrylic acylating agents) with one or more olefins. The olefins may be any of the olefins described above.

The carboxylic acylating agents may also be a dicarboxylic acylating agent other than succinic acylating agents. These acylating agents include dimer acylating agents, and reaction products of unsaturated monocarboxylic acylating agents and alpha, beta-unsaturated carboxylic acylating agent.

The dimer acylating agents include products resulting from the dimerization of unsaturated fatty acids, e.g., the above-described fatty acids. Generally, the dimer acids have an average from about 18, or about 28 to about 44, or to about 40 carbon atoms. In one embodiment, the dimer acids have preferably about 36 carbon atoms. The dimer acids are preferably prepared from $C_{18}$ fatty acids, such as oleic acids. The dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference. Examples of dimer acids include Empol® 1014, 1016 and 1018 Dimer Acid, each available from Emery Industries, Inc. and Hystrene® dimer acids 3675, 3680, 3687 and 3695, available from Humko Chemical.

In another embodiment, the carboxylic acylating agents are dicarboxylic acylating agents which are the reaction products of an unsaturated fatty acylating agents (e.g., the above-described fatty acids, preferably tall oil acids and oleic acids) with an alpha,beta- unsaturated monocarboxylic acylating agent (e.g., acrylic or methacrylic acylating agents). These acylating agents are taught in U.S. Pat. No. 2,444,328, the disclosure of which is incorporated herein by reference. Examples of these acylating agents include Westvaco® Diacid H-240, 1525 and 1550, each being commercially available from the Westvaco Corporation.

In another embodiment, the carboxylic acylating agent is a tricarboxylic acylating agent. Examples of tricarboxylic acylating agents include trimer acylating agents and the reaction product of an unsaturated carboxylic acylating agent (such as unsaturated fatty acids) and an alpha,beta- unsaturated dicarboxulic acylating agent (such as maleic, itaconic, and citraconic acylating agents, preferably maleic acylating agents). These acylating agents generally contain an average from about 18, or about 30, or about 36 to about 66, or to about 60 carbon atoms. The trimer acylating agents are prepared by the trimerization of the above-described fatty acids. In one embodiment, the dicarboxylic acylating agents made by reacting an unsaturated acylating agent with an alpha,beta-unsaturated dicarboxylic acylating agent contain an average from about 12, or about 18 to about 40, or to about 30 carbon atoms. Examples of these tricarboxylic acylating agents include Empol® 1040 available commercially from Emery Industries, Hystrene® 5460 available commercially from Humko Chemical, and Unidyme® 60 available commercially from Union Camp Corporation.

The above carboxylic acylating agents are reacted with a hydroxyamine or a polyalkylene polyamine to form useful surfactants. Any of the above-described hydroxyamines or polyalkylene amines may be used. In one embodiment the polyalkylene amine is a polyethylene amine, an amine bottom or a condensed amine. In another embodiment, the hydroxyamine is ethanolamine, dimethylethanolamine, diethylethanolamine, aminopropanol, triethanolamine, or diethanolamine.

A useful reaction product of a fatty monocarboxylic acylating agent and a polyamine is made by reacting one or more of a alkylene polyamine, such as triethylenetetraamine, with a mixture of fatty acids having from 5 to about 30 mole percent straight chain acid and about 70 to 95% mole branch chain fatty acids. Among the commercially available mixtures are those known widely in the trade as isostearic acid. These mixtures are produced as a by-product from the dimerization of unsaturated fatty acids as described in U.S. Pat. No. 2,812,342; and 3,260,671. These patents are hereby incorporated by reference for their disclosure of these reaction products and methods of making the same.

The branched chain fatty acids can also include those in which the branch is not alkyl in nature, such as found in phenyl and cyclohexyl stearic acid and the chlorostearic acids. Branched chain fatty carboxylic acid-/alkylene polyamine products have been described extensively in the art. See, for example, U.S. Pat. Nos. 3,110,673; 3,251,853; 3,326,801; 3,337,459; 3,405,064; 3,429,674; 3,468,639; and 3,857,791. These patents are hereby incorporated by reference for their disclosures of fatty acid/polyamine condensates.

In another embodiment, the reaction product of a fatty carboxylic acid and a polyamine are further reacted with an epoxide. Epoxides are generally lower aliphatic epoxides, having from 1, or about 2 to about 7, or about 5, or about 4 carbon atoms. Examples of these epoxides include ethylene oxide, propylene oxide, butylene oxide, cyclohexene oxide and octylene oxide. The epoxides generally react in an amount from about 0.5% to about 5% by weight of lower epoxide based on the total weight of the reaction product. The reaction generally occurs at a temperature above about 100° C. The reaction product of a fatty acid, polyamine and epoxide is described in U.S. Pat. No. 3,240,575 which is hereby incorporated by reference for its teachings to carboxylic acids, polyamines, epoxides and reaction products and methods of making the reaction products.

The following examples illustrate the reaction product of a fatty carboxylic acid or anhydride and a polyamine.

EXAMPLE 17

A reaction vessel is charged with 1133 parts of commercial diethylenetriamine and is heated to 110°-150° C. Isostearic acid (6820 parts) is added over a period of two hours. The mixture is held at 150° C. for one hour and then heated to 180° C. over an additional hour. Finally, the mixture is heated to 205° C. over 0.5 hour. During the heating period, the mixture is blown with nitrogen to remove volatiles. The mixture is held at 205°-230° C. for a total of 11.5 hours and then stripped at 230° C./20 torr to provide the desired acylated polyamine as a residue containing 6.2% nitrogen.

EXAMPLE 18

A reaction vessel is charged with 205 parts of a commercial tetraethylene pentamine heated to about 75° C. Isostearic acid (1000 parts) is added to the vessel, while purging with nitrogen. The temperature of the mixture is maintained at about 75°-110° C. The mixture then is heated to 220° C. and held at this temperature until the acid number of the mixture is less than 10. After cooling to about 150° C., the mixture is filtered, and the filtrate is the desired acylated polyamine having a nitrogen content of about 5.9%.

EXAMPLE 19

A reaction vessel is charged with a mixture of equivalent amounts of a naphthenic acid (1270 parts) and oleic acid (1110 parts) having an acid number of 180; the total quantity of the two acids used is such as to provide one equivalent of acid mixture for each two equivalents of the amine mixture used. A mixture (565 parts by weight) of an alkylene amine mixture consisting of triethylenetetramine and diethylene triamine in weight ratio of 3:1 is added to the vessel at 20°-80° C. The reaction is exothermic. The mixture is blown with nitrogen while it is being heated to 240° C. in 4.5 hours and thereafter heated at this temperature for 2 hours. Water is collected as the distillate. Ethylene oxide (140 parts) is added to the above residue at 170°-180° C. within a period of 2 hours while nitrogen is bubbled through the reaction mixture. The reaction mixture is then blown with nitrogen for 15 minutes and diluted with 940 parts of xylene to a solution containing 25% of xylene. The resulting solution has a nitrogen content of 5.4% and a base number of 82.

In another embodiment the surfactant is an amine or alkaline earth or transition metal salt of a sulfonic acid. The salt may be neutral or basic. In other words, the salt may have an excess of metal. The amount of excess metal is commonly expressed in terms of metal ratio. The term "metal ratio" is the ratio of the total equivalents of the metal to the equivalents of the acidic organic compound. A salt having 2 times as much metal as present in a normal salt will have metal excess of 1 equivalents, or a ratio of 2. In the present invention, these salts preferably have a metal ratio from about 1 to about 10, or to about 4, or to about 3, or to about 2. in another embodiment, the salt has a metal ratio between 1, or 1.1 to 1.7, or to 1.5. In another embodiment, the alkaline earth and transition metal salts are neutral salts.

The sulfonic acids are preferably mono-, di-, and tri-aliphatic hydrocarbon-substituted aromatic sulfonic acids. The hydrocarbon substituent may be derived from any of the above-described polyalkenes. Such sulfonic acids includes mahogany sulfonic acids, bright stock sulfonic acids, petroleum sulfonic acids, mono- and polywax-substituted naphthalene sulfonic acids, saturated paraffin wax sulfonic acids, unsaturated paraffin wax sulfonic acids, hydroxy-substituted paraffin wax sulfonic acids, tetraisobutylene sulfonic acids, tetraamylene sulfonic acids, lauryl cyclohexyl sulfonic acids, mono- and polywax-substituted cyclohexyl sulfonic acids, dodecylbenzene sulfonic acids, didodecylbenzene sulfonic acids, dinonylbenzene sulfonic acids, and the like.

A preferred group of sulfonic acids are mono-, di-, and tri-alkylated benzene and naphthalene (including hydrogenated forms thereof) sulfonic acids. Illustrative of the synthetically produced alkylated benzene and naphthalene sulfonic acids are those containing alkyl substituents having from about 8, or about 12 to about 40, or to about 30, or to about 24 carbon atoms. Such acids include di-isododecylbenzene sulfonic acid, wax-substituted phenol sulfonic acid, wax-substituted benzene sulfonic acids, polybutenylsubstituted sulfonic acid, polypropylenyl-substituted sulfonic acids derived from polypropylene having a number average molecular weights (Mn) of about 300-1500, more preferably about 800-1200, cetyl-chlorobenzene sulfonic acid, dicetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

In one embodiment, the sulfonic acid is an alkyl-substituted benzene sulfonic acid. The alkyl group generally contains at least 8 carbon atoms, or from about 8, or about 10, to about 40, or to about 30, or to about 24 carbon atoms. In one embodiment, the sulfonic acid is a dodecyl benzene "bottoms" sulfonic acid. The latter are acids derived from benzene which has been alkylated with propylene tetramers or isobutene trimers to introduce 1, 2, 3, or more branched-chain $C_{12}$ substituents on the benzene ring. Dodecyl benzene bottoms, principally mixtures of mono- and di-dodecyl benzenes, are available as by-products from the manufacture of household detergents. Similar products obtained from alkylation bottoms formed during manufacture of linear alkyl sulfonates (LAS) are also useful in making the sulfonates used in this invention.

The production of sulfonic acids from detergent manufacture by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, N.Y. (1969).

The salt of the sulfonic acid may be derived from an amine or an alkaline earth or transition metal compound. Any of the above described amines may be used.

The alkaline earth and transition metal salt include magnesium, calcium, barium, titanium, iron, and zinc salts. In one embodiment, the metal salt is an alkaline earth metal salt, preferably a calcium or barium sulfonate, preferably a calcium sulfonate.

The metal salts are prepared by procedures known to those in the art. One method of their preparation is to mix a sulfonic acid with an alkaline earth of transition metal containing base, such as an oxide or hydroxide.

LIME

The compositions of the present invention may also include lime. The lime in combination with the esters of the carboxy-containing interpolymers or their salts (A) provides improved thickening to the compositions. The lime is generally present in an amount from about 1, or about 2, up to about 10, or about 8 pounds per barrel (ppb).

WELL-DRILLING COMPOSITIONS

In one embodiment, the compositions of the present invention are well-drilling compositions. In one embodiment, the well-drilling compositions are invert water-in-oil emulsions. The well-drilling compositions generally have a density of about 9, or about 10 to about 21, or to about 18, or to about 14 pounds per gallon.

In one embodiment, the compositions of the present invention contain less than 1%, or less than 0.5% by weight of an oxygen-supplying salt. In another embodiment, the compositions are free of oxygen-supplying salts. These salts include ammonium nitrate and alkali or alkaline earth metal nitrates, chlorates, perchlorates and mixtures thereof. Specific examples of the oxygen-supplying salts are sodium nitrate, sodium perchlorate and ammonium perchlorate. The oxygen-supplying salts are used in an emulsion explosives. In one embodiment, the compositions of the present invention are non-explosive.

In another embodiment, the compositions contain less than 1% by weight, or 0.5% by weight of a non-oxidizing acid. In one embodiment, the compositions are free of non-oxidizing acids. These acids include an inorganic acid such as hydrochloric acid, sulfuric acid, hydrofluoric acid, sulfamic acid and the like, as well as organic acids including 1 to about 3 carbon atoms such as formic acid, acetic acid, propionic acid and the like. These non-oxidizing acids are typically used in acidizing fluids and in this embodiment are not present in the compositions of the present invention.

In one embodiment, the surfactant is included in well-drilling compositions along with barites (barium sulfates) or organophilic clays. In one embodiment the surfactant is the reaction product of a fatty carboxylic acylating agent and a polyamine (e.g., and in one embodiment an imidiazoline) or an alkaline earth or transition metal of a sulfonate.

The following examples relate to well-drilling compositions.

EXAMPLE A

An invert emulsion well-drilling composition is prepared by mixing 20.2 gallons of No. 2 diesel fuel with 14.3 gallons of a 30% calcium chloride brine solution. Then, 5 pounds per barrel (ppb.) of the product of Example 1, 5 ppb of lime, 1.25 ppb of CARBO-GEL (a organophilic clay available commercially from Milpark), and 162 ppb of MIL-BAR (a barium sulfate available from Milpark). The contents are mixed in a Waring blender to form a 50:50 water-in-oil emulsion.

EXAMPLES B-J

Following the procedure of Example A, the examples in the following table are prepared by the procedure described in Example A. In the following examples "bbl" means barrels and "ppb" means pounds per barrel.

TABLE

| | Ex. B | Ex. C | Ex. D | Ex. E | Ex. F |
|---|---|---|---|---|---|
| Diesel Fuel Oil (bbl.) | 0.34 | 0.34 | 0.55 | 0.55 | 0.55 |
| Product of Ex. 1 (ppb) | 5 | — | 5 | 5 | — |
| 38 (ppb) | — | 5 | — | — | 6 |
| Lime (ppb) | 5 | 7 | 5 | 5 | 4 |
| CARBO-GEL (ppb) | 1.25 | 1.0 | 2 | 2 | 1.5 |
| A calcium sulfonate[1] | 5 | — | 8 | — | — |
| A barium benzene sulfonate[2] | — | 10 | — | 4 | — |
| Product of Example 33 | — | — | — | — | 8 |
| 30% CaCl$_2$ Brine (bbl.) | 0.48 | 0.48 | 0.26 | 0.26 | 0.26 |
| MIL-BAR (ppb) | 162 | 160 | 206 | 206 | 210 |

| | Ex. G | Ex. H | Ex. I | Ex. J |
|---|---|---|---|---|
| Conoco LVT 200 (bbl.) | 0.34 | 0.55 | — | — |
| Total HDF 200 (bbl.) | — | — | 0.34 | 0.55 |
| Product of: | | | | |
| Ex. 1 (ppb) | — | 6 | — | — |
| Ex. 3 (ppb) | 5 | — | — | — |
| Ex. 36 (ppb) | — | — | 4 | 6 |
| Lime (ppb) | 4 | 5 | 7 | 5 |
| CARBO-GEL (ppb) | 0.75 | 1.5 | 2 | 1.0 |
| A calcium sulfonate[1] | — | 10 | — | 5 |
| 30% CaCl$_2$ Brine (bbl.) | 0.48 | 0.26 | 0.48 | 0.26 |
| Milbar (ppb) | 175 | 190 | 210 | 160 |

[1] A 60% by weight oil composition of a neutral calcium benzene sulfonate, wherein the molecular weight of the sulfonic acid is 430, and having a 10 base number (bromophenolblue), and a metal ratio of 1.

[2] A 67% by weight oil composition of a slightly basic barium benzene sulfonate, wherein the molecular weight of the sulfonic acid is 430, and having a 16 base number (bromophenolblue), and a metal ratio of 1.4.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A water-in-oil emulsion composition comprising a mixture of a brine and a liquid hydrocarbon, and (A) a viscosity increasing amount of at least one ester of a carboxy-containing interpolymer or salt thereof, wherein the interpolymer is prepared by polymerizing an olefine selected from the group consisting of alpha-olefins and vinyl aromatic monomers with at least one alpha, beta-unsaturated carboxylic acylating agent, and provided that when the olefin is vinyl toluene, then the alpha, beta-unsaturated carboxylic acylating agent is an alpha, beta-unsaturated dicarboxylic acylating agent.

2. The composition of claim 1, wherein the olefin is a vinyl aromatic monomer selected from styrene or substituted styrene.

3. The composition of claim 1, wherein the olefin is styrene.

4. The composition of claim 1, wherein the olefin is an alpha-olefin containing from 2 to about 30 carbon atoms.

5. The composition of claim 1, wherein the alpha, beta-unsaturated carboxylic acylating agent is an acrylic, methacrylic, fumaric, or maleic acylating agent.

6. The composition of claim 1, wherein the alpha, beta-unsaturated carboxylic acylating agent is maleic acid, anhydride or ester.

7. The composition of claim 1, wherein the carboxy-containing interpolymer is a terpolymer of a vinyl aromatic monomer or alpha-olefin; an alpha beta-unsaturated carboxylic acylating agent; and a interpolymerizable comonomer.

8. The composition of claim 7, wherein the interpolymerizable comonomer is selected from the group consisting of acrylic or methacrylic acid or esters.

9. The composition of claim 1, wherein the ester group is derived from an alcohol containing at least 8 carbon atoms.

10. The composition of claim 1, wherein the ester is derived from alcohols containing about 6 to about 30 carbon atoms.

11. The composition of claim 1, wherein the ester is derived from a combination of alcohols containing at least about 8 carbon atoms and less than 7 carbon atoms.

12. The composition of claim 1, wherein the carboxy-containing interpolymer contains a carbonyl-amino group selected from an amide, an imide, an ammonium salt, amidic acid salts, or mixtures thereof.

13. The composition of claim 12, wherein the carbonyl-amino group is derived from at least one amine.

14. The composition of claim 1, wherein the brine is present in the mixture in an amount from about 5 to about 90 parts by volume and the liquid hydrocarbon is present in the mixture in an amount from about 10 to about 95 parts by volume, wherein the total parts by volume of brine and liquid hydrocarbon total 100 parts by volume.

15. The composition of claim 1, wherein the brine is present as a discontinuous phase and the liquid hydrocarbon is present as a continuous phase.

16. The composition of claim 1, wherein the carboxy-containing interpolymer is free of sulfonyl groups.

17. The composition of claim 1, further comprising (B) a weighting agent.

18. The composition of claim 17, wherein the weighting agent (B) is barium sulfate, iron oxide, calcium chloride, calcium bromide, zinc bromide or zinc chloride.

19. The composition of claim 1, further comprising (C) an organophilic clay.

20. The composition of claim 1, further comprising (D) at least one surfactant.

21. The composition of claim 1, further comprising (E) lime.

22. A water-in-oil emulsion composition comprising a mixture of from about 5 to about 90 parts by volume of a brine as a discontinuous phase and from 10 to 95 parts by volume of a liquid hydrocarbon as a continuous phase, wherein the total parts by volume of brine and liquid hydrocarbon total 100 parts by volume, and (A) at least 0.1% by weight of the composition of an ester of a interpolymer of styrene and an alpha, beta-unsaturated carboxylic acylating agent, wherein the ester is derived from at least one alcohol containing an average of at least about 6 carbon atoms.

23. The composition of claim 22, wherein the esters is derived from at least one alcohol containing from about 6 to about 40 carbon atoms.

24. The composition of claim 22, wherein the alpha, beta-unsaturated carboxylic acylating agent is an acrylic, methacrylic, fumaric or maleic acylating agent.

25. The composition of claim 22, wherein the alpha, beta-unsaturated carboxylic acylating agent is maleic acid, anhydride or ester.

26. The composition of claim 22, wherein (A) has a carbonyl-amino group comprising an amide, an imide, an ammonium salt, amidic acid salt or mixtures thereof.

27. The composition of claim 22, wherein the ester group is derived from a combination of alcohols containing greater than 8 carbon atoms and containing less than 7 carbon atoms.

28. The composition of claim 22, further comprising (B) a weighting agent or (C) an organophilic clay.

29. The composition of claim 28, wherein the weighting agent (B) is barium sulfate, iron oxide, calcium chloride, calcium bromide, zinc bromide or zinc chloride.

30. The composition of claim 22, further comprising at least (D) one surfactant.

31. The composition of claim 22, further comprising (E) lime.

32. A water-in-oil emulsion composition comprising a mixture of from about 5 to about 90 parts by volume of a brine as a discontinuous phase and from 10 to about 95 parts by volume of a liquid hydrocarbon as a continuous phase, wherein the total parts by volume of brine and liquid hydrocarbon total 100 parts by volume, and (A) a viscosity increasing amount of at least one ester of a carboxy-containing interpolymer or salt thereof, wherein the interpolymer is prepared by polymerizing an olefin selected from the group consisting of alpha-olefins and vinyl aromatic monomers with at least one alpha, beta-unsaturated carboxylic acylating agent, provided that when the olefin is vinyl toluene, then the alpha, beta-unsaturated carboxylic acylating agent is an alpha, beta-unsaturated dicarboxylic acylating agent, (B) at least one weighting agent or (C) organophilic clay and, (D) at least one surfactant.

33. The composition of claim 32, wherein the olefin is styrene, the alpha, beta-unsaturated carboxylic acylating agent is a maleic acylating agent and the ester groups are derived from an alcohol containing at least about 8 carbon atoms.

34. The composition of claim 32, wherein the weighting agent (C) is barium sulfate, iron oxide, calcium chloride, calcium bromide, zinc bromide or zinc chloride.

35. A method of drilling a well-bore hole, comprising the steps of introducing into the well-bore hole the composition of claim 1 and drilling or completing the well-bore hole.

36. A method of drilling a well-bore hole, comprising the steps of introducing into the well-bore hole the composition of claim 22 and drilling or completing the well-bore hole.

37. A method of drilling a well-bore hole, comprising the steps of introducing into the well-bore hole the composition of claim 32 and drilling or completing the well-bore hole.

* * * * *